United States Patent [19]

Kondo et al.

[11] Patent Number: 5,115,267

[45] Date of Patent: May 19, 1992

[54] ZOOM LENS DRIVE MECHANISM

[75] Inventors: Shigeru Kondo; Naoki Takatori, both of Tokyo; Masaaki Morizumi, Omiya; Shino Kanamori, Tokyo, all of Japan

[73] Assignee: Fuji Photo Film Co., Ltd., Kanagawa, Japan

[21] Appl. No.: 556,514

[22] Filed: Jul. 24, 1990

Related U.S. Application Data

[62] Division of Ser. No. 398,684, Aug. 25, 1989, Pat. No. 4,961,635.

[30] Foreign Application Priority Data

Sep. 6, 1988 [JP] Japan ................................ 63-223139
Sep. 6, 1988 [JP] Japan ................................ 63-223145

[51] Int. Cl.⁵ .............................................. G03B 13/14
[52] U.S. Cl. .................................................. 354/221
[58] Field of Search ............................... 354/221, 222

[56] References Cited

U.S. PATENT DOCUMENTS 4,831,399  5/1989  Tsurukawa et al. ................ 354/221
4,887,109 12/1989  Fujita et al. ......................... 354/222

Primary Examiner—Michael L. Gellner
Attorney, Agent, or Firm—Sughrue, Mion, Zinn, Macpeak & Seas

[57] ABSTRACT

A parallax correcting mechanism for a camera having a zoom lens. An objective lens is placed in the optical path of a viewfinder and is movable perpendicular to the optical axis of the viewfinder in cooperation with the focusing mechanism of the associated camera. A movable lens is also placed in the optical path of the viewfinder and is movable along the optical axis of the viewfinder in cooperation with the zoom adjustment of a zoom lens associated with the camera. The movement of the objective lens corrects for any parallax error between the viewfinder and an image seen by the zoom lens of the camera. The movement of the movable lens insures that the field angle of the viewfinder will correspond to that of the zoom lens.

2 Claims, 16 Drawing Sheets

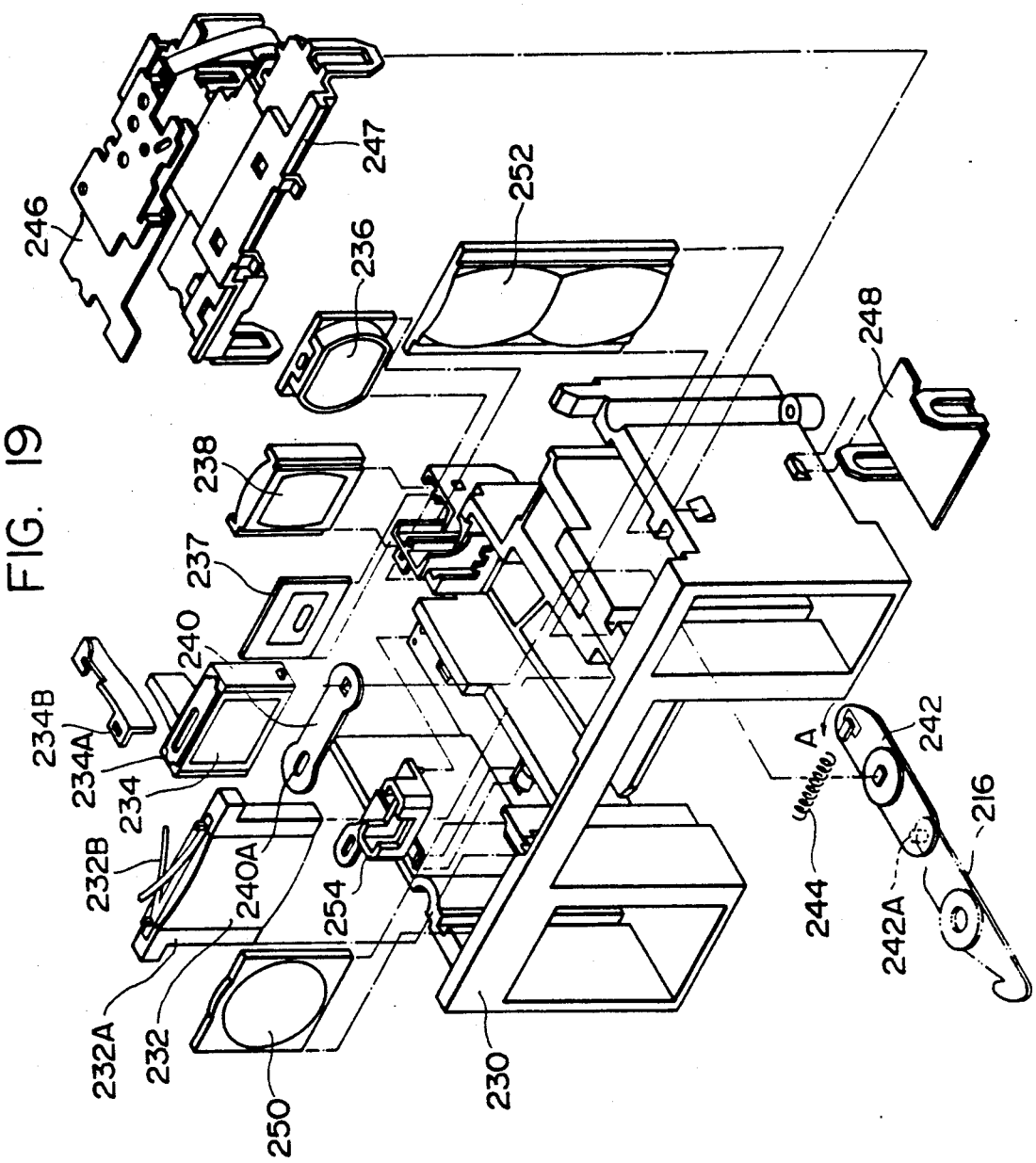

ZOOM LENS DRIVE MECHANISM

This is a divisional of application Ser. No. 07/398,684 filed Aug. 25, 1989, now U.S. Pat. No. 4,961,635.

BACKGROUND OF THE INVENTION

1. Field of the Invention

The present invention relates to a zoom lens drive mechanism and, in particular, to a zoom lens drive mechanism which is capable of zoom driving and focus driving zoom lenses including a front group of lenses and a rear group of lenses.

2. Description of the Related Art

Generally, a zoom lens is composed of a group of focus lenses, a group of varying lenses, a group of compensator lenses and a group of master lenses.

Therefore, an image of an object to pass through the above-mentioned zoom lens is first formed by the focus lens group and the image is then altered in magnification before it is formed. Further, after the image point movement of the formed image, of which magnification has been altered by the above-mentioned varying lens group, is corrected by the compensator lens group, the formed image is formed on the surface of an image pickup device as the object image by the master lens group which does not participate in the zooming but remains stationary.

In such zoom lens, the focal point thereof can be adjusted by rotating, for example, a focus ring to thereby move the focus lens group in the optical axis direction thereof, and the magnification thereof can be changed without moving the focal point thereof by rotating a zoom ring to thereby move the varying and compensator lens groups in the optical axis direction thereof with a given relation between the two lens groups.

Also, due to the fact that the above-mentioned zoom lens is composed of the four lens groups, the movement of the focus lens group for adjustment of the focus and the movement of the varying and compensator lens groups in zooming do not interfere with each other. On the other hand, when a zoom lens is composed of two lens groups, that is, a front lens group and a rear lens group, in order to adjust its focal point, only the front lens group must be moved, and, in zooming, the front and rear lens groups must be moved simultaneously. For this reason, it has been difficult to realize a simple structure which is free from the interference between the two kinds of movements.

SUMMARY OF THE INVENTION

The present invention aims at eliminating the drawbacks found in the above-mentioned prior art mechanisms.

Accordingly, it is an object of the invention to provide a zoom lens drive mechanism which is capable of driving a zoom lens composed of a front lens group and a rear lens group by means of a simple and compact mechanism.

In order to achieve the above object, there is provided a zoom lens drive mechanism which comprises first and second groups of lenses respectively disposed movably in the direction of the optical axis of a zoom lens to form the zoom lens, a zoom shaft disposed in parallel to the optical axis of the zoom lens, a zoom cam ring rotatably disposed in the zoom shaft and including first and second cam grooves in the periphery thereof, a first lens group drive means disposed in the zoom shaft and freely movable in the axial direction thereof, and a focus cam means movable in the direction of the zoom shaft together with the first lens group drive means and also freely movable with respect to the first lens group drive means, wherein cam followers respectively provided in the first lens group drive means and second lens group are respectively brought into engagement with the first and second cam grooves in the zoom cam ring, a cam follower provided in the first lens group is brought into engagement with a cam groove formed in the focus cam means, the zoom cam ring is rotated to thereby move the first and second lens groups in the optical axis direction, and the focus cam means is moved to thereby move the first lens group in the optical axis direction.

According to the invention, the zoom shaft is disposed in parallel with the optical axis of the zoom lens composed of the first and second lens groups; the zoom cam ring is freely rotatably mounted to the zoom shaft, and the first lens group drive means is mounted to the zoom shaft such that it is freely movable in the axial direction thereof. That is, the zoom cam ring and the first lens group drive means are both disposed on one and the same zoom shaft. Also, there is provided the focus cam means which can be moved in the zoom shaft direction together with the first lens group drive means and also which can be freely moved with respect to the first lens group drive means. Further, the cam followers respectively provided in the first lens group drive means and in the second lens group are respectively in engagement with the first and second cam grooves in the zoom cam ring, and the cam follower provided in the first lens group is engagement with the cam groove in the focus cam means.

In the above-mentioned structure, therefore, if the zoom cam ring is rotated, then the first lens group is moved by means of the first lens group drive means and focus cam means, and the second lens group is moved simultaneously when the first lens group is moved, whereby a zooming operation can be achieved. Also, if the focus cam means is moved, then only the first lens group is moved to thereby adjust the focus of the zoom lens.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 19 is an exploded perspective view of a finder case part.

DETAILED DESCRIPTION OF THE INVENTION

Detailed description will hereunder be given of the preferred embodiments of a zoom lens drive mechanism according to the present invention with reference to the accompanying drawings.

Figure 1:
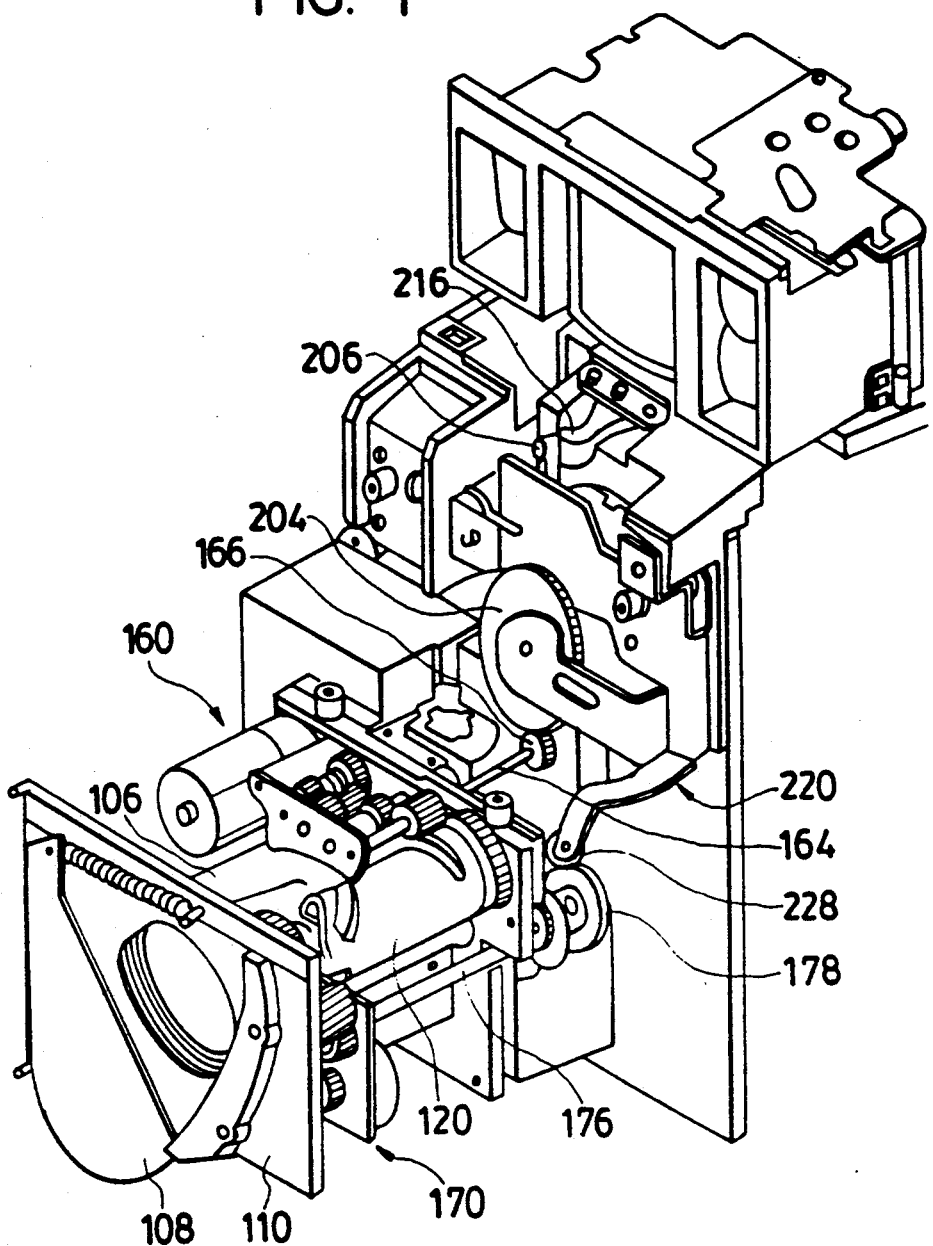
FIG. 1 is a perspective view of the mechanism part of a camera optical system including a zoom lens drive mechanism according to the invention.
Figure 2:
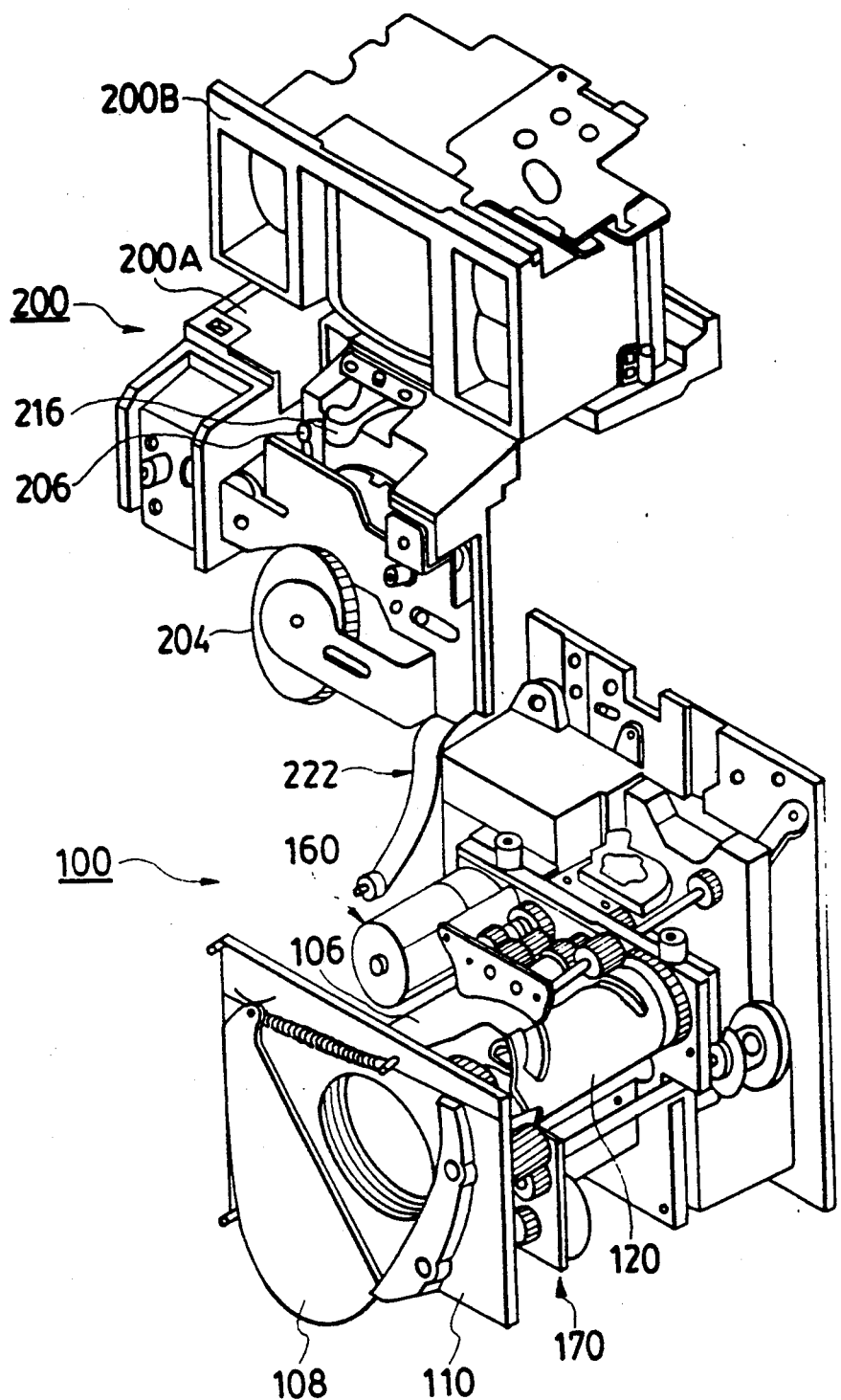
FIG. 2 is a perspective view of the mechanism part shown in FIG. 1, in which the mechanism part is divided into a zoom lens part and a finder part.

In FIG. 1, there is shown a perspective view of a mechanism part of a camera optical system including a zoom lens drive mechanism according to the present invention and, in FIG. 2, there is shown a perspective view of the mechanism part in FIG. 1, in which the mechanism part is divided into a zoom lens part 100 and a finder part 200.

Drive Mechanism for Zoom Lens

Figure 3:
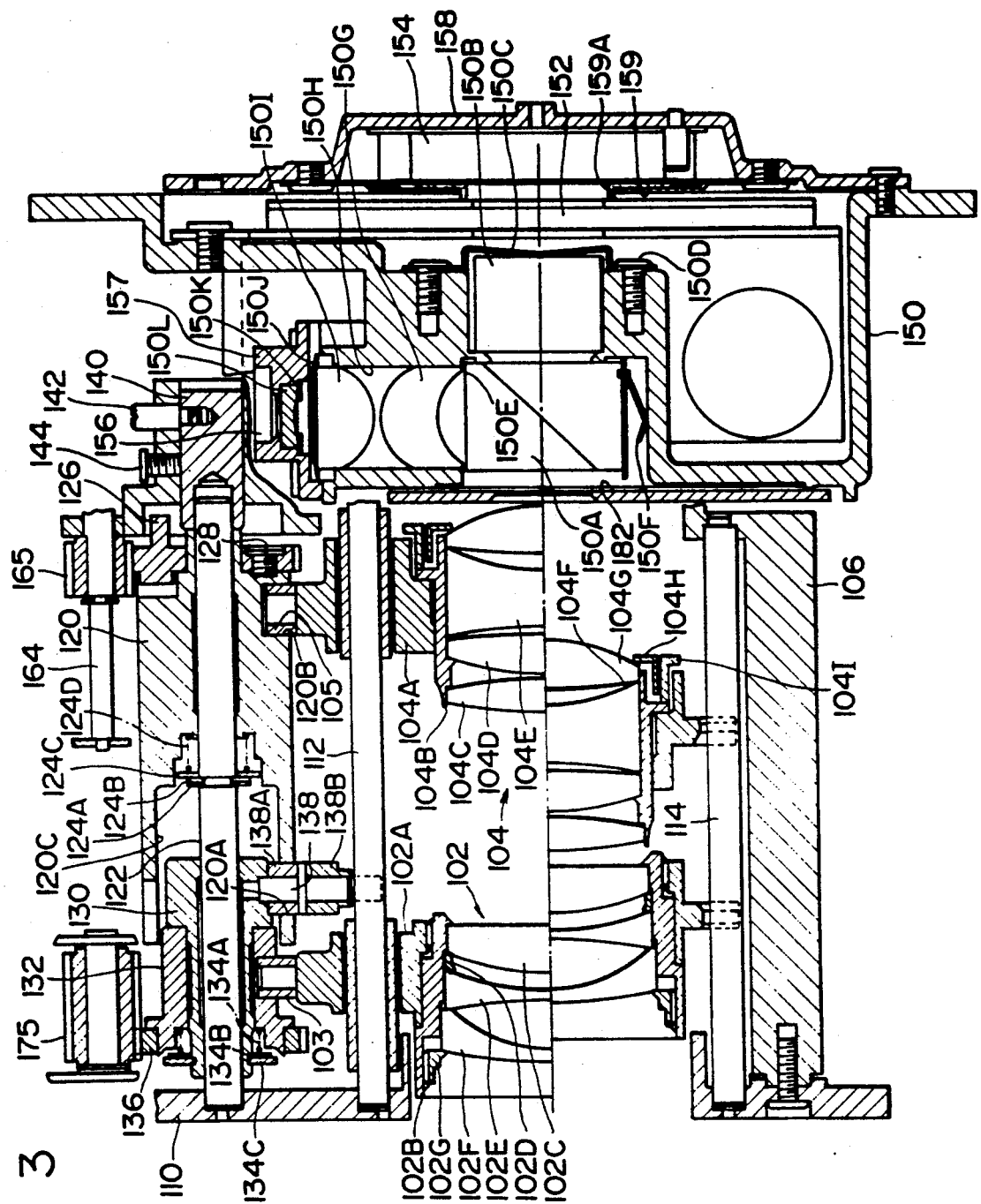
FIG. 3 is a section view of the zoom lens part shown in FIG. 2.

At first, a drive mechanism for a zoom lens will be described. In FIG. 3, there is shown a section view of the zoom lens part 100 shown in FIG. 2, in which the upper section of the optical axis of the zoom lens shows a case where the zoom lens is situated at a telephoto end and the lower section of the zoom lens optical axis shows a case where the zoom lens is situated at a wide-photo end. Also, in FIG. 4, there is shown an exploded perspective view of the main components of the zoom lens drive mechanism.

Figure 4:
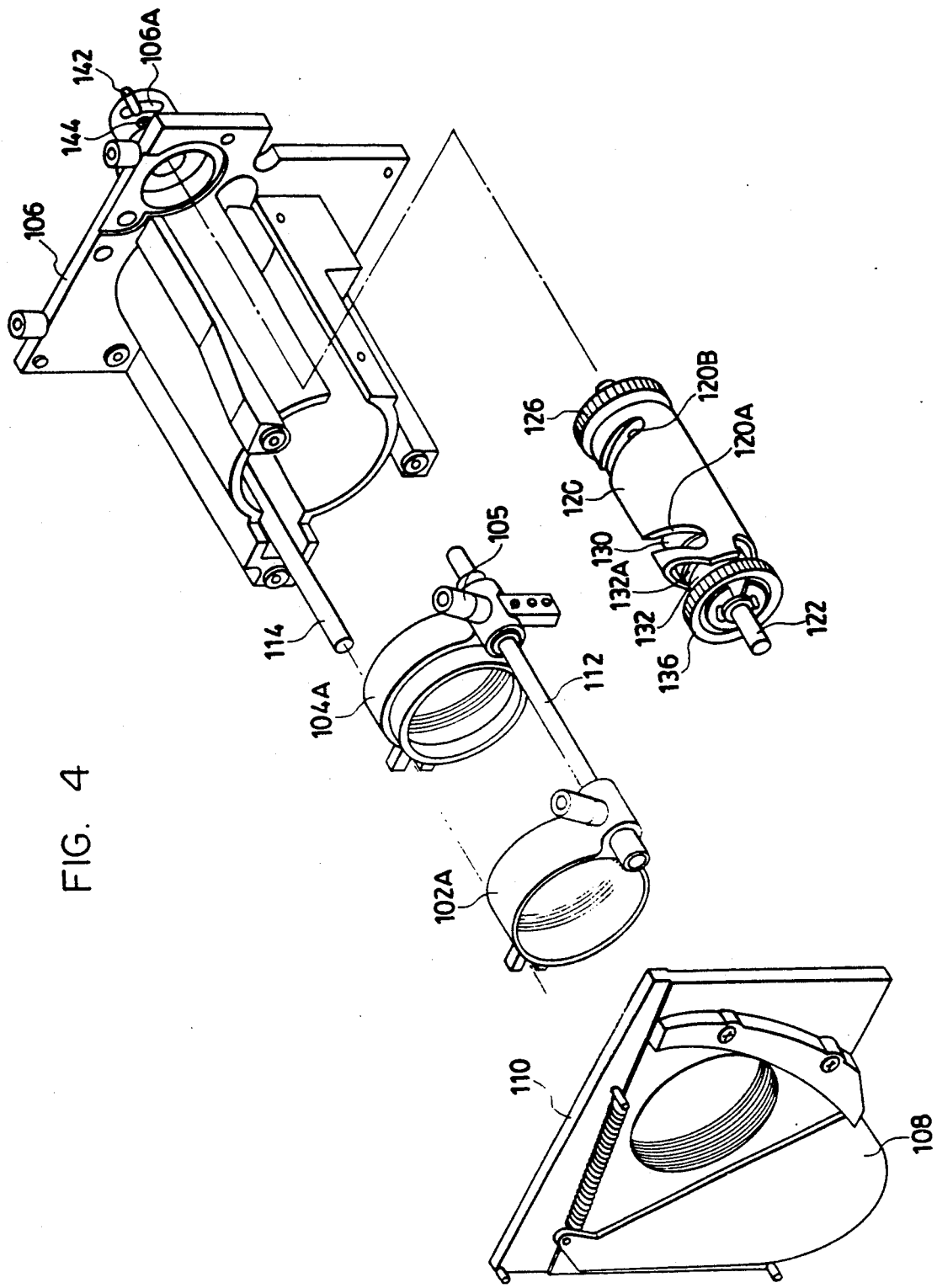
FIG. 4 is an exploded perspective view of the main components of the present zoom lens drive mechanism.

As shown in FIGS. 3 and 4, a front slide frame 102A and a rear slide frame 104A are respectively guided slidably in the optical axis direction by a main guide bar 112 and a follower guide bar 114 respectively interposed between a lens mount main body 106 and a front fixed plate 110 provided with a barrier.

Here, the zoom lens is composed of a front group of lenses 102 and a rear group of lenses 104. To construct the front lens group 102, after a lens 102C, a clearance ring 102D, a lens 102E and a lens 102F are inserted into a front lens frame 102B, a stop ring 102G is threadedly mounted (see FIG. 5(A)) and further the front lens frame 102B is threadedly mounted to the above-mentioned front slide frame 102A.

Figure 5:
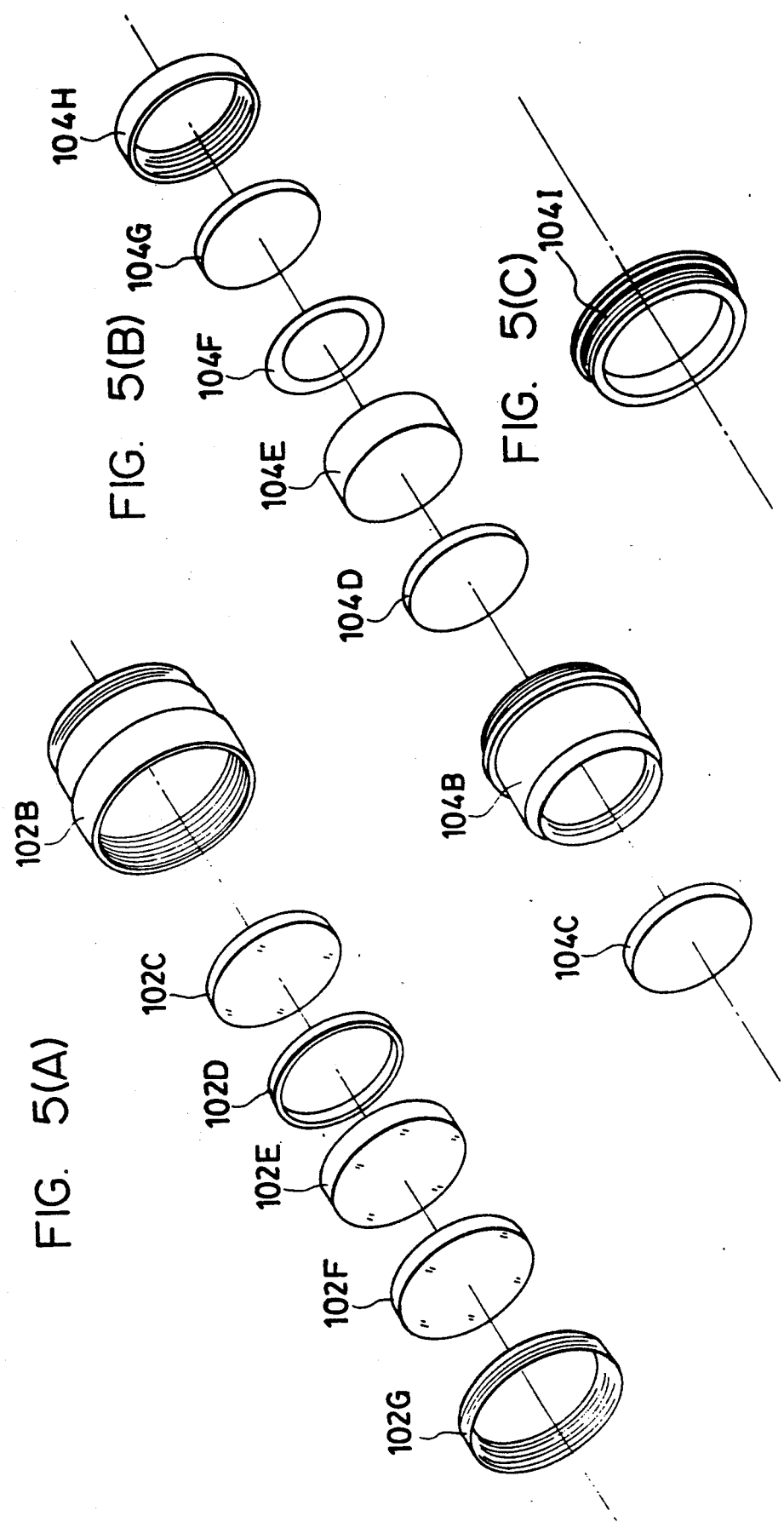
FIGS. 5(A) and (B) are respectively exploded perspective views of front and rear groups of lenses.
FIG. 5(C) is a perspective view of a rear lens stop ring.

On the other hand, to construct the rear lens group 104, after a lens 104C is mounted within a rear lens frame 104B from ahead and lenses 104D and 104E, a light shield plate 104F, and a lens 104G are inserted into the rear lens frame 104B from behind, a stop ring 104H is threadedly mounted (see FIG. 5(B)), and further the rear lens frame 104B is inserted into the above-mentioned rear slide frame 104A and is then fixed by a rear lens stop ring 104I (see FIG. 5(C)).

Next, description will be given below of a zoom cam ring 120, a front lens group drive collar 130 and a focus cam ring 132 which are used to move the above-mentioned front lens group 102 and rear lens group 104.

As shown in FIG. 3, the zoom cam ring 120 is freely rotatably disposed in a zoom shaft 122 provided in parallel with the main guide bar 112 and follower guide bar 114 of the zoom lens, and the front lens group drive collar 130 is also inserted into the zoom shaft 122 such that it can be freely slided in the axis direction thereof. Also, the focus cam ring 132 is freely rotatably disposed in the front lens group drive collar 130.

In other words, an E ring 124A is fitted over the substantially central portion of the zoom shaft 122. Rearwardly of the E ring 124A, a spring stop washer 124B, a spring stop plate 124C, a spring 124D and the zoom cam ring 120 are sequentially fitted over the zoom shaft. Also, a gear 126 is fixed to the zoom cam ring 120 by screws 128, 128 (see FIG. 6).

Figure 7:
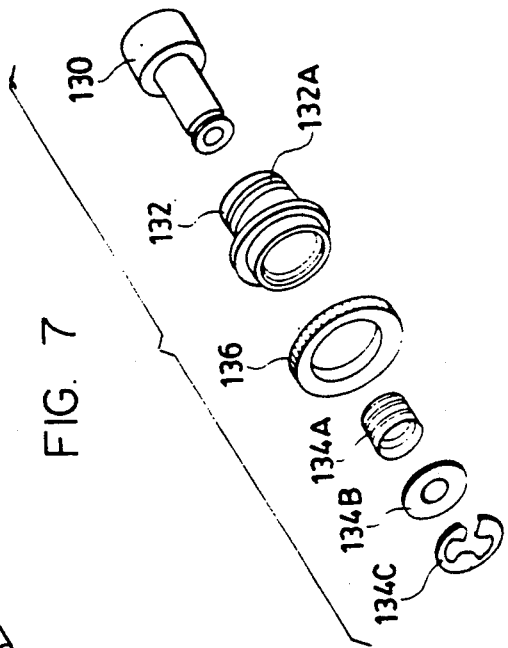
FIG. 7 is an exploded perspective view of a front lens group drive collar, a focus cam ring other components.

On the other hand, a focus cam ring 132, a spring 134A, and a washer 134B are sequentially fitted over the front lens group drive collar 130, while the washer 134B is engaged by an E ring 134C (see FIG. 7). That is, the focus cam ring 132 is energized by the spring 134A so that it is abutted against the side surface of the front lens group drive collar 130. By the way, a gear 136 is fitted over the focus cam ring 132.

Figure 8:
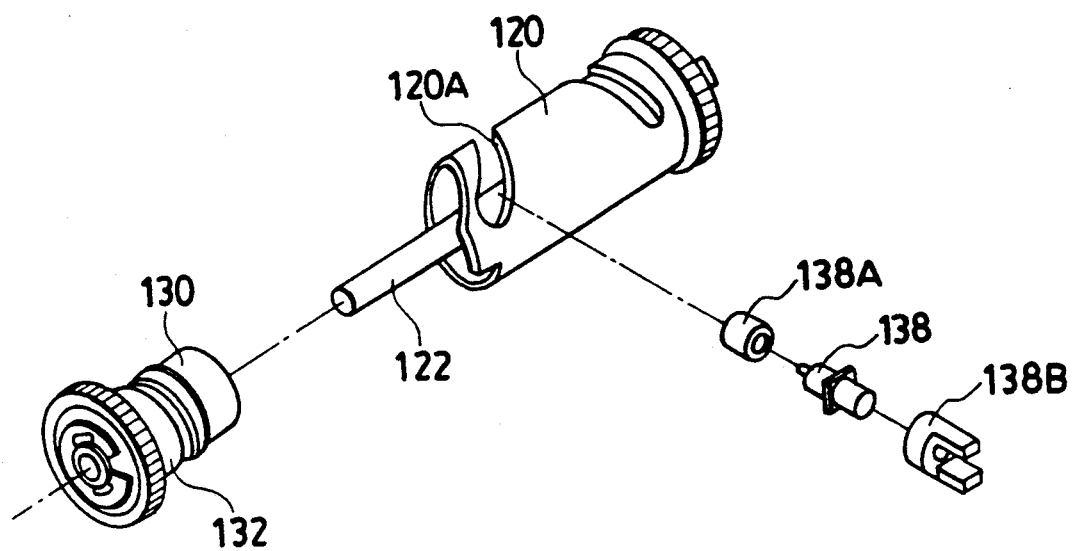
FIG. 8 is a perspective view to illustrate how to mount the zoom cam ring and front lens group drive collar onto the zoom shaft.

Then, the front lens group drive collar 130 provided with the above-mentioned focus cam ring 132, as shown in FIG. 8, is fitted over the zoom shaft 122 (see FIG. 4) and, after then, an operation shaft 138 including a roller 138A and a rotation preventive fork 138B is planted onto the front lens group drive collar 130 by means of a cam groove 120A formed in the zoom cam ring 120.

Then, one end of the zoom shaft 122 having the zoom cam ring 120, front lens group drive collar 130 and other components thereon, as shown in FIG. 3, is fixed to the front fixed plate 110 and the other end thereof is inserted into an adjustment collar 140. At that time, as described before, the zoom cam ring 120 is energized by the spring 124D interposed between the zoom cam ring 120 and the zoom shaft 122 such that the rear end of the zoom cam ring 120 can be abutted against the leading end of the adjustment collar 140 and the zoom shaft 122 is also energized by the same spring 124D such that one end of the zoom shaft 122 can be abutted against the front fixed plate 110.

Also, the adjustment collar 140 is arranged such that it can be moved in the axial direction of the zoom shaft 122 to thereby fix the zoom cam ring 120 at an arbitrary position in the axial direction of the zoom shaft 122. That is, in the adjustment collar 140, as shown in FIG. 3, there is planted an adjustment pin 142 by means of a cam groove 106A formed in the lens barrel main body 106. By moving the adjustment pin 142 along the cam groove 106A, the adjustment collar 140 can be advanced or retreated in the axial direction of the zoom shaft 122. Also, the adjustment collar 140 is arranged such that it can be fixed at an arbitrary position by tightening a stop screw 144.

Figure 6:
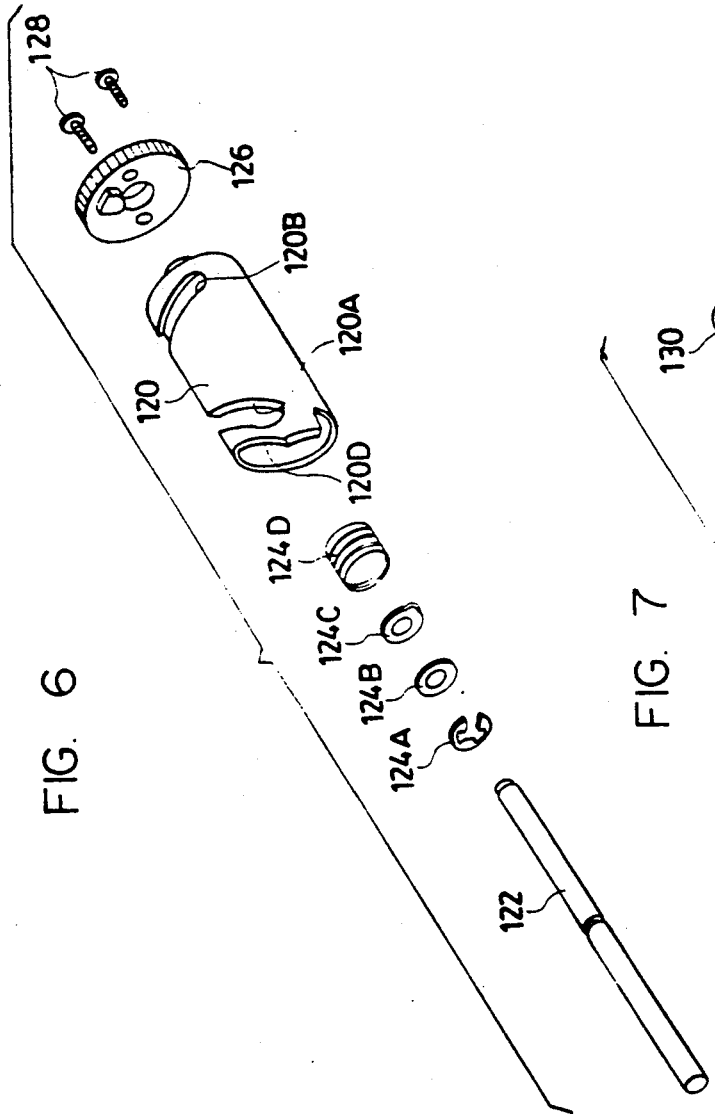
FIG. 6 is an exploded perspective view of a zoom cam ring and other components to be inserted through a zoom shaft.

Now, in the zoom cam ring 120, as shown in FIG. 6, there are formed two cam grooves 120A and 120B. A roller 138A on the operation shaft 138 provided in the front lens groove drive collar 130, as shown in FIG. 8, is slidably engaged with the cam groove 120A, and a roller 105 provided in the rear slide frame 104A is slidably engaged with the cam groove 120B.

Also, the rotation preventive fork 138B planted on the operation shaft 138 provided on the front lens group drive collar 130, as shown in FIG. 3, is mounted such that it holds the main guide bar 112 therebetween, whereby the front lens group drive collar 130 is prevented from the rotating round the zoom shaft 122. The main guide bar 112 is formed of a highly reliable material and, due to use of the main guide bar 112 as the rotation preventive member, the accuracy of prevention of rotation of the front lens group drive collar 130 round the zoom shaft 122 can be kept at a high level.

On the other hand, in the focus cam ring 132, as shown in FIG. 7, there is formed a cam groove 132A with which is slidably engaged a roller 103 provided in the front slide frame 102A, as shown in FIG. 3.

Therefore, if the zoom cam ring 120 is rotated, then the front lens group drive collar 130 and rear slide frame 104A, with the rollers 138A and 105 thereof being respectively in engagement with the cam grooves 120A and 120B of the zoom cam ring 120, are moved in the axial direction of the zoom shaft 122 with a constant relation therebetween. That is, as described before, due to provision of the rotation preventive fork 138B, the front lens group drive collar 130 can be moved only in the axial direction of the zoom shaft 122. With the movement of the front lens group drive collar 130, the front lens group 102 is moved by means of the focus cam ring 132, roller 103 and front slide frame 102A, and, with the movement of the rear slide frame 104A, the rear lens group 104 is moved. And, the front lens group 102 and real lens group 104 forming the zoom lens are arranged to move differently from each other in zooming due to the cam grooves 120A and 120B of the zoom cam ring 120 so that the focus of the zoom lens cannot be moved.

Now, as can be understood from FIG. 3 as well, the zoom cam ring 120 is constructed such that a portion (in which the cam groove 120A is formed) thereof if hollow and that a portion of the front lens group drive collar 130 and a portion of the focus cam ring 132 are able to advance into the hollow portion 120C. Also, as shown in FIG. 6, the zoom cam ring 120 has an end portion 120D on the side of the cam groove 120A and the end portion 120D is cut out or notched. The notched end portion 120D can avoid interference between the roller 103 (FIG. 3) in engagement with the cam groove 132A of the focus cam ring 132 and the zoom cam ring 120.

In other words, due to the above-constructed zoom cam ring 120, the length of the zoom lens drive mechanism in the zoom shaft direction can be reduced.

On the other hand, if the focus cam ring 132 is rotated, then the front slide frame 102A, of which roller 103 is in engagement with the cam groove 132A of the focus cam ring 132, that is, the front lens group 102 is moved in the axial direction of the guide bars 112 and 114. And, by means of the movement of the front lens group 102, the focusing of the zoom lens can be achieved.

Now, the cam groove 132A formed in the focus cam ring 132 is a groove which is linear with respect to the angle of rotation of the focus cam ring 132. Also, if the range of angle of rotation of the focus cam ring 132 actually used is assumed to be 100°, then the cam groove 132A is formed in the range of 200° including the actually used range of angle of rotation of 100° as well as a further formed angle of 50° and a further rearward angle of 50° with respect to the actually used range of angles of rotation of 100°. The reason why the cam groove 132A is formed substantially exceeding the actually used range of angle of rotation is to perform a zoom adjustment.

In general, the zoom adjustment of the zoom lens is performed so that the focus of the zoom lens is not moved in zooming and such zoom adjustment is achieved in the following manner.

In other words, as shown in FIG. 3, by moving the adjustment collar 140 in the axial direction of the zoom shaft 122, the position of the zoom cam ring 120, in abutment against with the adjustment collar 140, on the zoom shaft 122 is adjusted. By means of this, the front lens group 102 and rear lens group 104 can be wholly moved in the optical axis direction.

On the other hand, the adjustment of the clearance between the front and rear lens groups 102 and 104 is achieved by properly setting the actually used range of rotation of the cam groove 132A formed in the abovementioned focus cam ring 132, that is, a reference position (namely, a home position) of the focus cam ring 132 in the focus adjustment. Setting of the home position will be described later in detail.

In FIG. 3, the image of the light that has passed through the zoom lens is formed on the light receiving surface of a CCD sensor 154 by means of a beam splitter 150A, a low pass filter 150B and a shutter 152. On the light receiving surface of the CCD sensor 154 there are accumulated the electric charges that correspond to an object to be photographed, and then the electric signals that correspond to the patterns of the electric charges are output. Then, the electric signals are magnetically recorded into a video floppy disc (not shown).

Also, a light beam divided by the beam splitter 150A is received through lenses 150G, 150I for automatic exposure (AE) and a Fresnel lens 150L by an AE sensor 156. According to the among of light detected by the AE sensor 156, a diaphragm plate 182, which is interposed between the rear lens group 104 and the beam splitter 150A, is rotated to a proper position. The diaphragm plate 182 is formed with a plurality of holes having different diameters and, the amount of incident light can be controlled by selecting one of these holes.

Figure 9:
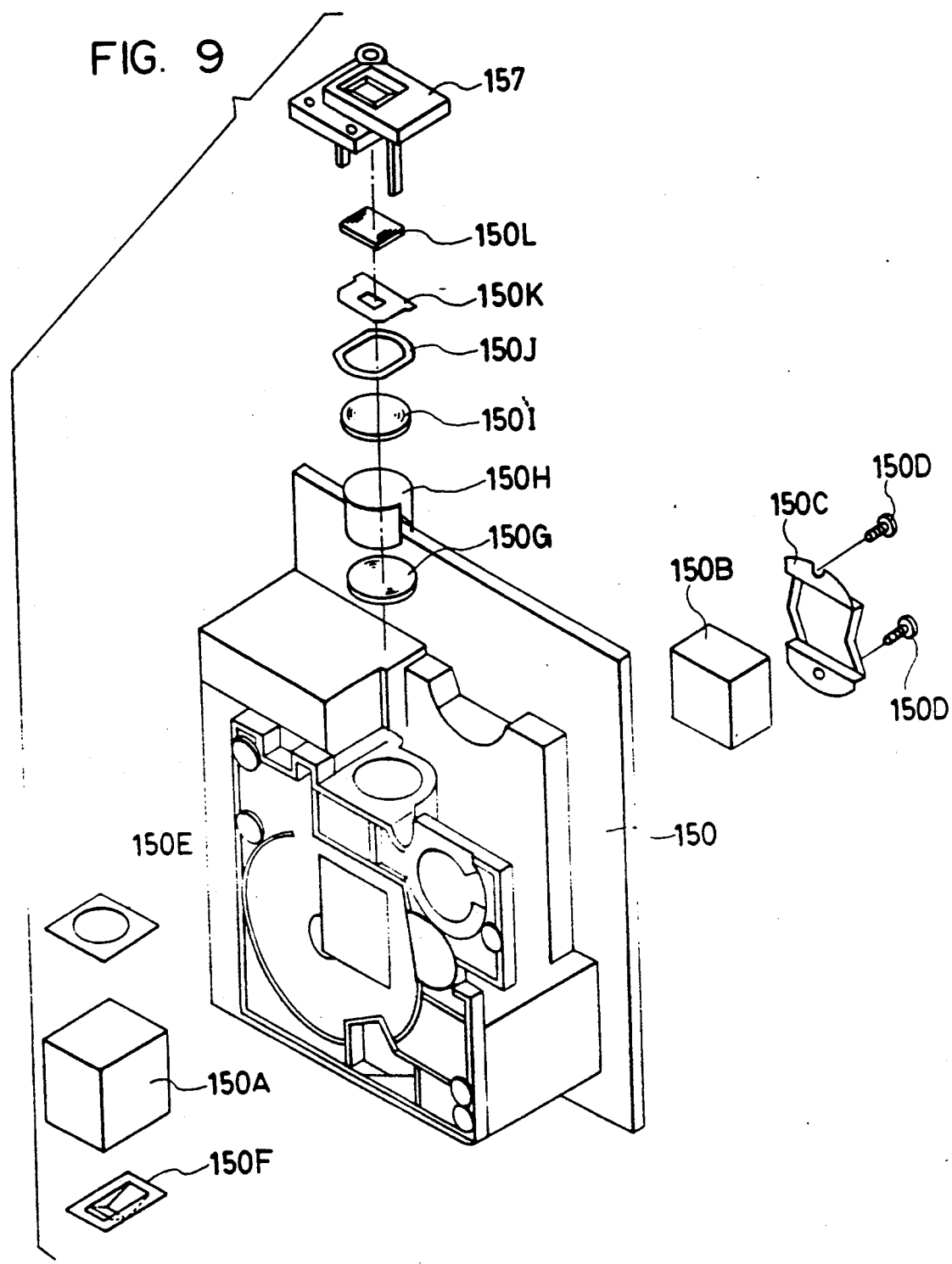
FIG. 9 is an exploded perspective view of a prism box part.

Referring now to FIG. 9, there is shown an exploded perspective view of a prism box part in which the abovementioned optical system is stored. In this figure, the beam splitter 150A is inserted into a prism box 150 from ahead. A prism mask 150E is inserted on the upper surface side of the beam splitter 150A and a stop spring 150F is inserted on the lower surface side of the beam splitter 150A.

Also, the low pass filter 150B is inserted the prism box 150 from behind and is then fixed by a stop plate 150C and two screws 150D. As shown in FIG. 3, the CCD sensor 154 is positioned in a CCD holder 158, and is then fixed by a stop plate 159 having light shield rubber 159A, and after that the CCD holder 158 is fixed to the rear portion of the prism box 150.

On the other hand, oppositely to the upper surface of the beam splitter 150A, the lens 150G, a light shield sheet 150H, the lens 150I and a lens stopper 150J are sequentially inserted into the prism box 150 from above, and finally an AE sensor frame 157 having an AE sensor mask 150K and the Fresnel lens 150L fixed thereto is screwed to the prism box.

Next, description will be given below of a zoom drive part 160 which is used to rotate the zoom cam ring 120, a focus drive part 170 used to rotate the focus cam ring 132, an iris drive part 180 for rotating the diaphragm plate 182 and the like.

The above-mentioned drive parts 160, 170 and 180, as shown in FIG. 1, are respectively disposed on the peripheries of the lens mount main body 106. However, the iris drive part 180 is not shown in FIG. 1.

Figure 10:
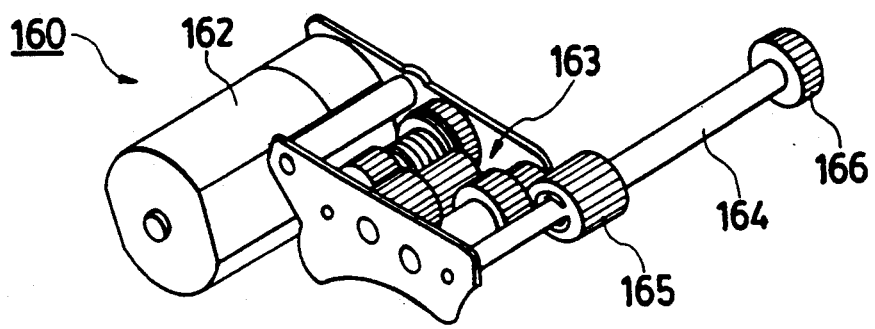
FIG. 10 is a perspective view of a zoom drive part.

The zoom drive part 160, as shown in FIG. 10, comprises a zoom motor (namely, a gear motor) 162, a gear train 163, gears 165, 166 on a zoom connecting shaft 164, and the like. The output of the zoom motor 162 is decelerated through the gear train 163 and is then transmitted to the gear 165 on the zoom connecting shaft 164. The other gear 166 on the zoom connecting shaft 164 is used to move a moving lens within the finder in conjunction with zooming and the detailed description of the gear 166 will be given afterwards.

The gear 165, as shown in FIG. 3, is in mesh with a gear 126 fixed to the zoom cam ring 120 and, therefore, if the zoom motor 162 is driven, then the driving force of the zoom motor 162 is transmitted through the gear train 163 and gears 165 and 126 to the zoom cam ring 120, so that the zoom cam ring 120 can be rotated. If the zoom cam ring 120 is rotated, then, as described before, the front and rear lens groups 102 and 104 are moved in the optical axis direction with a constant relation therebetween to thereby performing a zooming operation.

Also, the zoom information on the zoom lens which is driven in the above-mentioned manner can be detected in the following manner.

Figure 11A:
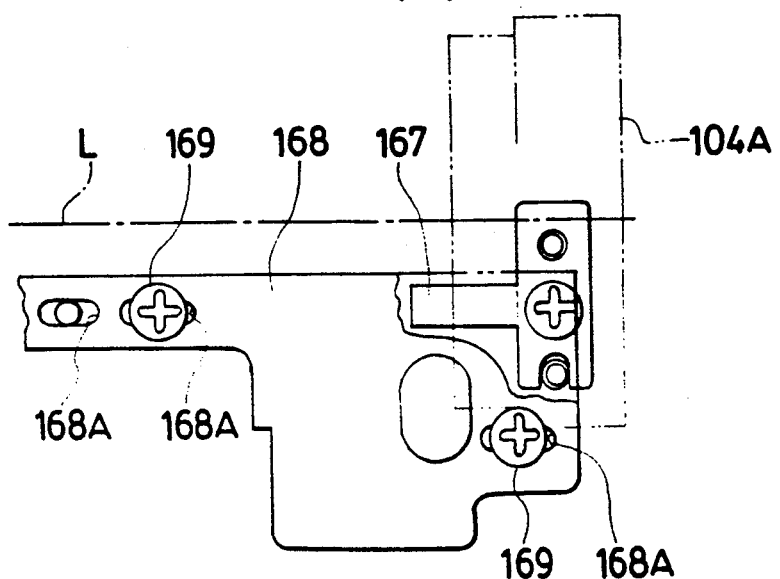
FIGS. 11(A) and (B) are respectively front and plan views of a zoom information detection part.
Figure 11B:
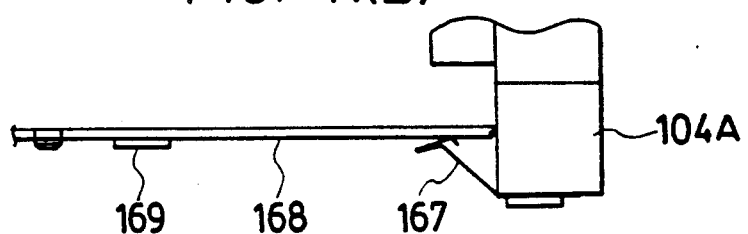

In other words, as shown in FIGS. 11 (A) and (B), there is mounted a brush 167 to the rear slide frame 104A, while, in a zoom code plate 168 on which the brush 167 is slidable, there is provided a zoom code which shows the absolute position of the rear slide frame 104A. Therefore, in zooming the zoom lens, if the brush 167 is moved on the zoom code with the movement of the rear slide frame 104A, then there is obtained a code signal (zoom information) which corresponds to the position of movement thereof. The zoom information is used to control an AE system, for example. Also, the zoom code plate 168 is formed with elongated bores 168A, 168A and 168A, which permits the zoom code plate 168 to move in the direction of an optical axis L. And, the zoom code plate 168 is adjusted in position so that desired zoom information can be output, for example, when the zoom lens is moved to the telephoto end, before it is fixed by screws 169, 169.

Figure 12:
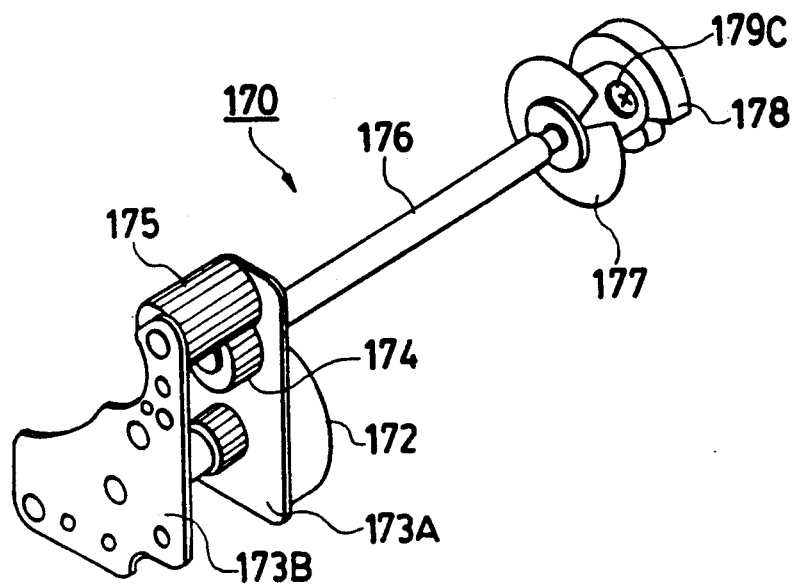
FIG. 12 is a perspective view of a focus drive part.

Now, the focus drive part 170, as shown in FIG. 12, comprises an AF motor 172, a gear train including gears 174 and 175 interposed between a gear part carrier plate 173A and a gear part upper plate 173B, a light shield plate 177 provided on an AF connecting shaft 176, an AF drive cam 178 and the like.

The output of the AF motor 172 is decelerated through a gear train (not shown) to the gear 174 and also to the gear 175 in mesh with the gear 174. The gear 174 is fixed to the AF connecting shaft 176 and the gear 175, as shown in FIG. 3, is in mesh with a gear 136 fixed to the focus cam ring 132.

For this reason, if the AF motor 172 is driven, then the driving force thereof is transmitted through a gear train (not shown), and the gears 174, 175, 136 to the focus cam ring 132, so that the focus cam ring 132 can be rotated. If the focus cam ring 132 is rotated, then the front lens group 102 is moved in the optical axis direction, as described before, to thereby adjust the focus of the zoom lens. It should be noted here that the gear 175 has a sufficient tooth length to be able to intermesh with the gear 136 even if the gear 136 fixed to the focus cam ring 132 is moved in the axial direction of the zoom shaft 122 together with the front lens group drive collar 130 in zooming.

Also, due to the rotational movements of the gear 174, the light shield plate 177 and AF drive cam 178 respectively fixed to the AF connecting shaft 176 are rotated simultaneously. Here, there are provided a photo interrupter and a limit switch (not shown) which respectively correspond to the light shield plate 177 and AF drive cam 178. The photo interrupter turns ON when a notch 177A formed in the light shield plate 177 is moved to a predetermined detection position, while the limit switch is turned ON or OFF by the AF drive cam 178. Also, the photo interrupter and limit switch are used to detect a home position when the focus of the zoom lens is adjusted automatically.

Now, the AF motor 172 is a pulse motor which is capable of detecting the current position of the focus cam ring 132 by counting the number of pulses output to the AF motor 172 since the detection of the home position. And, a distance up to the object is measured by use of distance measuring means and then the AF motor 172 is driven so that the position of rotation of the focus cam ring 132 can come to a position corresponding to the measured distance, whereby the automatic focus adjustment can be achieved.

Figure 13:
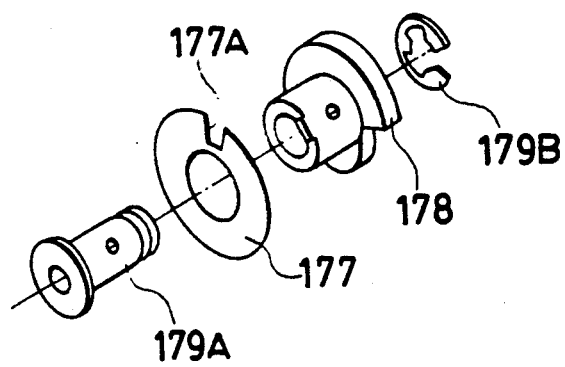
FIG. 13 is an exploded perspective view of a light shield plate, an AF drive cam and other components disposed in an AF connecting shaft of a focus drive part.

Also, as shown in FIG. 13, the light shield plate 177 and AF drive cam 178 are respectively fitted over an AF connecting shaft collar 179A and are then secured by an E ring 179B. Further, the AF connecting shaft collar 179A is fitted over the AF connecting shaft 176 and is then fixed onto the AF connecting shaft 176 by a screw 179C extending through the AF drive cam 178 and AF connecting shaft collar 179A (FIG. 12). Here, the mounting positions of the light shield plate and the like on the AF connecting shaft 176 are adjusted in such a manner that the home position detection can be achieved, for example, when the focus cam ring 132 is situated at a position corresponding to an infinity end. Further, the AF drive cam 178 moved vertically an objective lens within the finder in order to correct a parallax, and this will be described later in detail.

Figure 14:
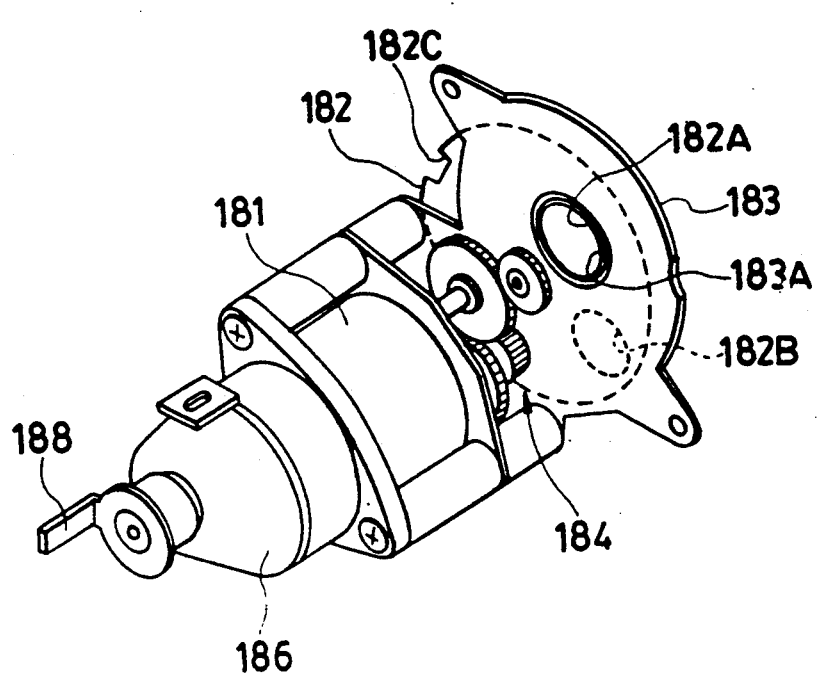
FIG. 14 is a perspective view of an iris drive part.

Now, the iris drive part 180 also serves a barrier drive part and, as shown in FIG. 14, it comprises an iris motor (a pulse motor) 181, the diaphragm plate 182 rotatably disposed in an bottom board 183 having a bore 183A, a gear train 184 interposed between the iris motor 181 and the diaphragm plate 182, a drive arm 188 and the like.

The outputs of the iris motor 181 can be taken out from the two ends of the drive shaft thereof. That is, one output thereof is transmitted through the gear train 184 to the diaphragm plate 182 and the other is transmitted through a barrier reduction member 186 to the drive arm 188.

The bore 183A in the bottom board 183 has a center which is identical with the optical axis of the zoom lens and the diaphragm plate 182 is formed with 5 bores, 182A, 182B,—at equal pitch intervals. The five bores also face the bore 183A in the bottom board 183 and are different in diameter from one another. And, the iris motor 181 is controlled in accordance with the amount of light received from the object and detected by the AE sensor 156 and it rotates the diaphragm plate 182 so that one of the five bores in the diaphragm 182 can face the bore 183A in the earth plate to thereby obtain a desired amount of incident light. Also, the diaphragm plate 182 is formed with a notch 182C and, by means of the output of a photo interrupter (not shown) to detect the notch 182C, the home position in the automatic exposure control can be detected.

On the other hand, the output of the iris motor 181 is decelerated by the barrier reduction member 186 and is then applied to the drive arm 188 to thereby rotate the same arm. By means of the rotational movements of the drive arm 188, a barrier 108 can be opened or closed, which will be described later.

It should be understood that the present invention is not limited to the above-mentioned embodiment but the front lens group 102 and the rear lens group 104 may be reversed with each other.

Barrier Opening/Closing Mechanism

Next, a mechanism for opening and closing a barrier will be described below in detail.

Figure 15A:
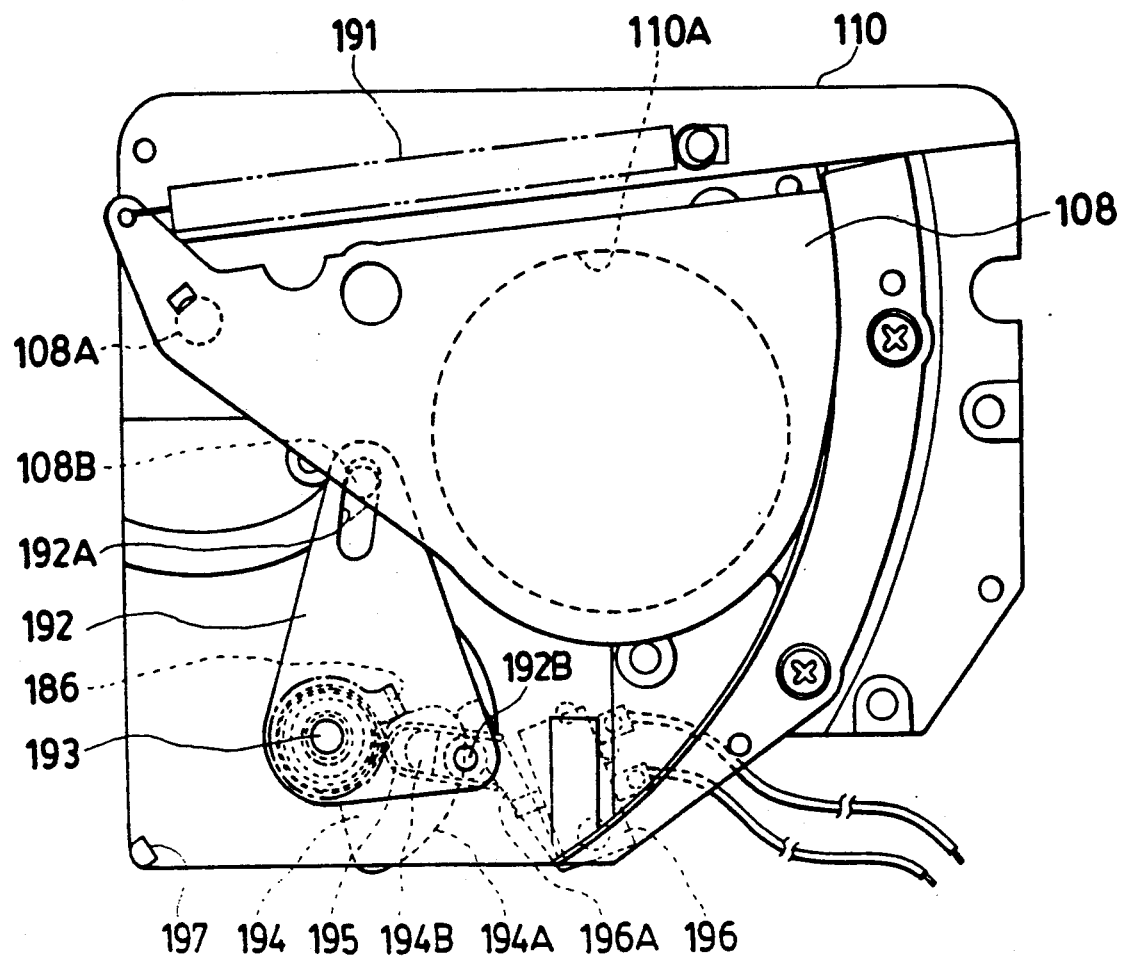
FIG. 15(A) is a front view of a barrier opening/closing mechanism.
Figure 15B:
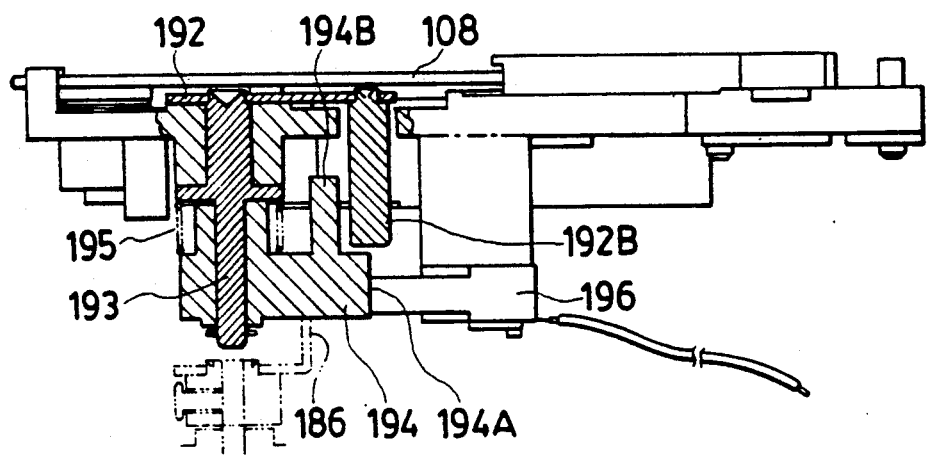
FIG. 15(B) is a bottom view, partly in section of the barrier opening/closing mechanism in FIG. 15(A)

In FIG. 15(A), there is shown a front view of the barrier opening/closing mechanism and, in FIG. 15 (B), there is shown a bottom view, partially in section, of the mechanism shown in FIG. 15 (A).

As shown in these figures, the barrier opening/closing mechanism is mainly composed of the barrier 108, a tension spring 191, a drive plate 192, a switch cam 194, a torsion spring 195, and a drive arm 186 which is driven by the abovementioned iris motor 181.

The barrier 108 is mounted to the front fixed plate 110 such that it can be freely rotated about a support shaft 108A and the barrier 108 is also energized by the tension spring 191 in a direction to open a bore 110A formed in the fixed plate 110, that is, in a clockwise direction about the support shaft 108A.

The drive plate 192 is fixed to a drive shaft 193 which is rotatably disposed in the front fixed plate 110 and, in the drive plate 192, there is formed an elongated bore 192A which is engageable with a pin 108B provided in the barrier 108 and there is also planted a pin 192B to which the driving force is transmitted.

The switch cam 194 is rotatably disposed in the abovementioned drive shaft 193 and it includes a cam portion 194A to cause a limit switch 196 to turn ON or OFF and a pin 194B which is planted thereon. The torsion spring 195 includes a coil portion which is inserted into the switch cam 194. The two ends of the torsion spring are in engagement with the pins 192B and 194B in such a manner that the two ends surrounds the pins.

Also, the center of rotation of drive arm 186 to be driven by the iris motor 181 is coaxial with the drive shaft 193 on which the switch cam 194 is disposed. The drive arm 186 can be brought into contact with the side surface of the switch cam 194 when it is rotated.

Next, description will be given below of the operation of the barrier opening/closing mechanism constructed in the above-mentioned manner.

FIG. 15A shows the closed state of the barrier. In this state, the energizing force of the tension spring 191 is transmitted to the pin 108A on the barrier 108, the drive plate 192, the pin 192B on the drive plate 192, the torsion spring 195, and the pin 194B on the switch cam 194 in this order, trying to cause the switch cam 194 to rotate in a counter-clockwise direction in FIG. 15(A), but, due to the fact that the drive arm 186 is abutted against the side surface of the switch cam 194, the switch cam 194 is prevented from rotating, whereby the closed state of the barrier can be maintained. Also, in this case, since any desired pressing force from the cam portion 194A of the switch cam 194 is not applied to the lever 196A of the limit switch, the limit switch 196 is OFF.

Figure 16A:
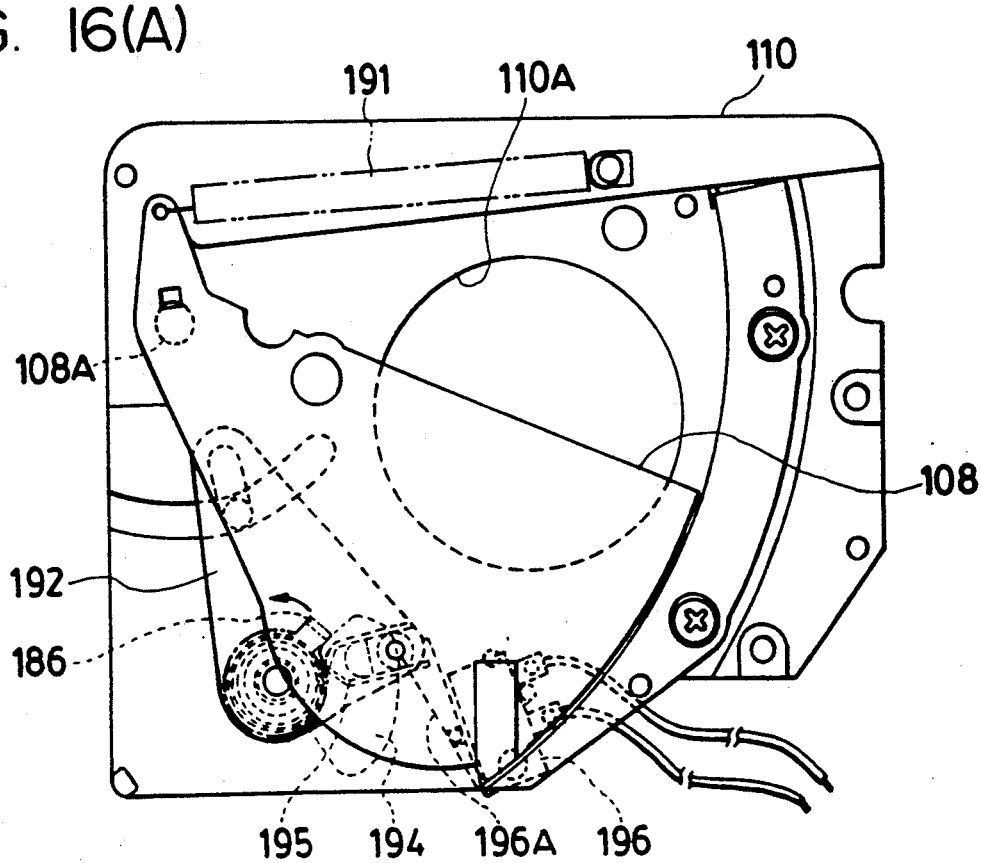
FIGS. 16(A) and (B) respectively front views of the barrier opening/closing mechanism, respectively illustrating the half open and full open states of the barrier.

From this state, if the drive arm 186 is rotated counterclockwise to a position shown in FIG. 16(A), then the barrier 108 is rotated clockwise due to the energizing force of the tension spring 191 to a half open state. Also, if the drive arm 186 is further rotated clockwise to a position shown in FIG. 16(B), then the barrier 108 is further rotated clockwise to a fully open state. In the respective states shown in FIGS. 16 (A) and (B), since the lever 196A of the limit switch 196 is pressed by the cam portion 194A of the switch cam 194, the limit switch 196 is ON.

Figure 16B:
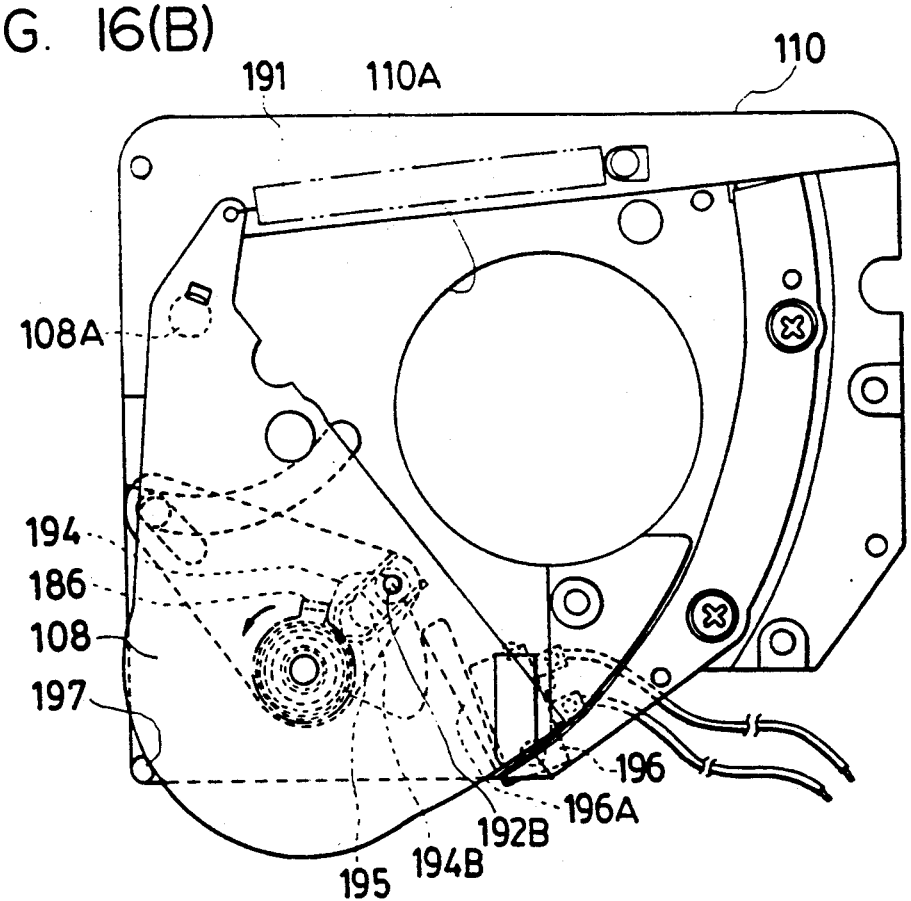

If the drive arm 186 is rotated counter-clockwise further from the state shown in FIG. 16(B), then the barrier 108 is brought into contact with a stopper 197 and thus the further rotational movement of the barrier 108 is prevented, with the result that the drive arm 186 is caused to move away from the side surface of the switch cam 194. And, the automatic exposure control is performed in a given area after the barrier 108 is fully opened and the drive arm 186 moves away from the side surface of the switch cam 194.

In other words, responsive to the rotation of the iris motor 181 for opening the barrier 108 from the barrier closed state shown in FIG. 15(A) to the barrier open state shown in FIG. 16(B), the diaphragm plate 182 has been rotated by 2 rotations or so. And, for example, a position where the diaphragm plate 182 is rotated by three rotations is considered as a home position, and, by controlling the further rotations of the diaphragm plate 182 thereafter, the exposure control is carried out. The above-mentioned home position is detected according to the time when detection signals are output three times from a photo interrupter to detect the notch 182C formed in the diaphragm plate 182, after the output of the above-mentioned limit switch 196 rises from OFF to ON. The control on the rotational movement of the diaphragm plate 182 is performed by applying the number of drive pulses corresponding to the exposure control to the iris motor (pulse motor) 181 from the time of detection of the above-mentioned home position.

On the other hand, if the drive arm 186 is rotated in the clockwise direction from the state shown in FIG. 16(B), then the rotational force thereof is transmitted to the pin 194B on the switch cam 194, the torsion spring 195, the pin 192B on the drive plate 192, the drive plate 192, and the pin 108B on the barrier 108 in this order, thereby causing the barrier 108 to rotate in the counter-clockwise direction against the energization force of the tension spring 191. In this manner, when the barrier 108 is completely closed as shown in FIG. 15(A), then the limit switch 196 turns OFF to thereby stop the rotation of the iris motor 181.

When, during the closing operation of the barrier 108, the rotational movement of the barrier 108 is prevented by any obstacle, then the drive plate 192 is stopped together with the barrier 108, but the switch cam 194 is continuously rotated in the clockwise direction. Due to this, the pin 194B on the switch cam 194 is separated away from the pin 192B on the drive plate 192, with the result that the two end portions of the torsion spring 195 holding the pins 194B and 192B therebetween are gradually opened against the energizing force of the torsion spring 195. Therefore, if the obstacle is removed, then the barrier 108 is rotated in an instant to the rotational position of the switch cam 194 by the energizing force of the torsion spring 195.

Parallax Correction Mechanism and Zoom Finder

Next, description will be given below of the parallax correction mechanism and the zoom finder. As shown in FIGS. 1 and 2, the finder part 200 is disposed above the zoom lens part 100. The finder part 200 can be further divided into a finder carrier plate section 200A and a finder case section 200B disposed above the finder carrier plate section.

Figure 17:
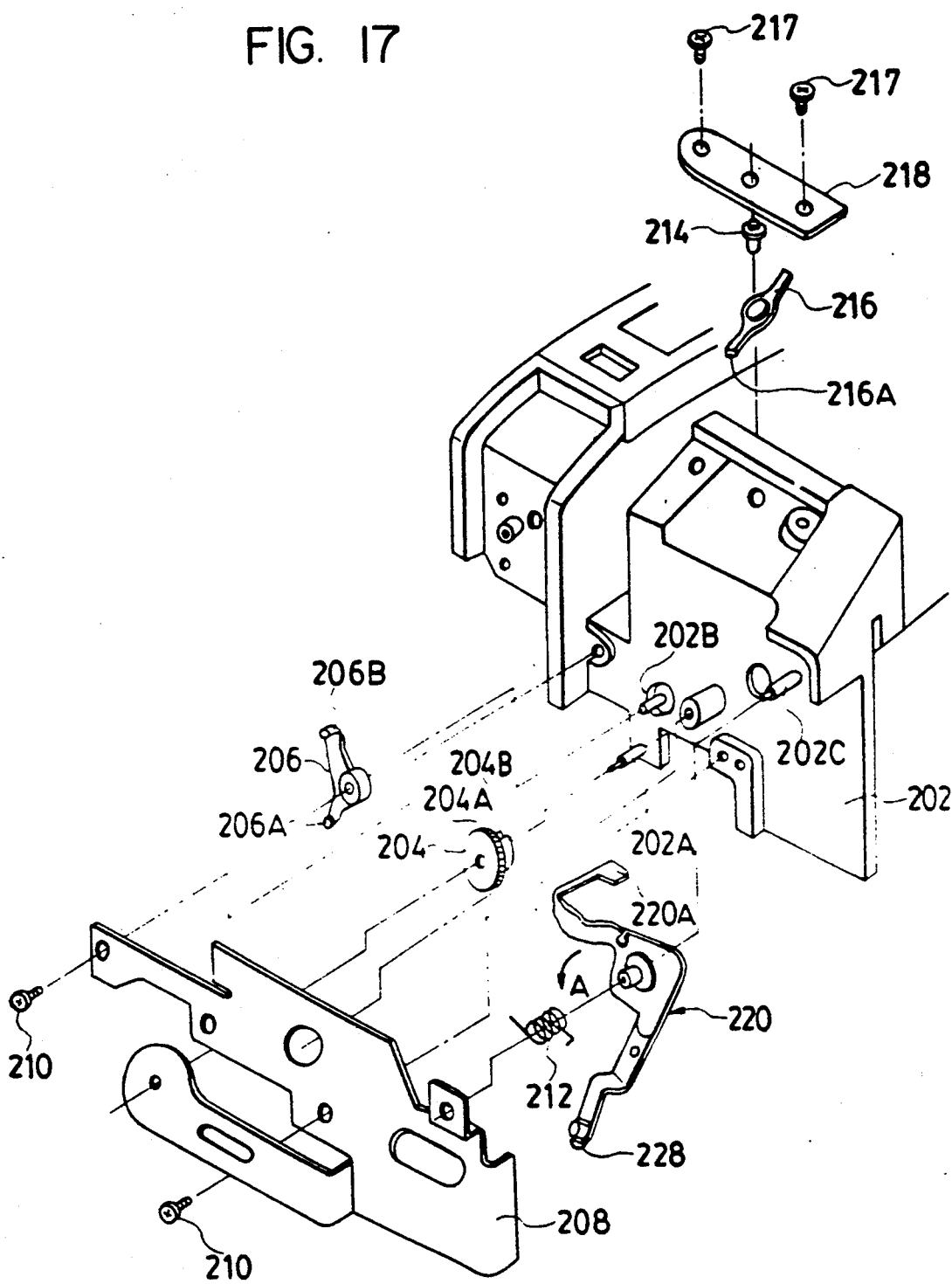
FIG. 17 is an exploded perspective view of a finder carrier plate part.

The finder carrier plate section 200A mainly functions as transmission means to transmit the driving forces from the zoom drive part 160 and focus drive part 170 of the zoom lens part 100 to the finder case section 200B. In FIG. 17, there is shown an exploded perspective view of the finder carrier plate section 200A.

In FIG. 17, there are provided on a carrier plate 202 three pins 202A, 202B and 202C over which an F cam 204, an F cam follower 206 and an AF connecting lever part 220 are freely rotatably fitted respectively. And, in order to prevent the latter three members from slipping off out of place, a stop member 208 is fixed to the carrier plate 202 by screws 210, 210. Between the AF connecting lever part 220 and stop member 208 there is interposed a torsion spring 212 and the AF connecting lever part 220 is biased in the direction of an arrow A by this torsion spring 212.

Also, in the carrier plate 202, an F intermediate lever 216 is rotatably disposed by means of an F short lever shaft 214 which is supported by a bridge stopper 218 fixed to the carrier plate 202 by screws 217, 217.

Now, there is provided a gear 204A in the F cam 204 and the gear 204A, as shown in FIG. 1, intermeshes with a gear 166 provided on the zoom connecting shaft 164 of the zoom drive part 160. Also, the F cam follower 206 has a lower end 206A in sliding contact with the cam surface of the F cam 204 and the upper end 206B of the F cam follower 206 is in engagement with the lower end 216A of the F intermediate lever 216. For this reason, when the F cam 204 is rotated in link with the zoom drive operation, then the F intermediate lever 216 is rotated by means of the F cam follower 206.

On the other hand, the AF connecting lever part 220 is provided with a roller 228 in the lower end portion thereof and the roller 228, as shown in FIG. 1, is in contact with the AF drive cam 178 on the AF connecting shaft 176 of the focus drive part 170. For this reason, when the AF drive cam 178 of the focus drive part 170 is rotated in link with the automatic focusing operation, then the AF connecting lever part 220 is rotated and the leading end 220A of the AF connecting lever part 220 is moved substantially in a vertical direction.

Now, description will be given of the abovementioned AF connecting lever part 220 in more detail.

Figure 18:
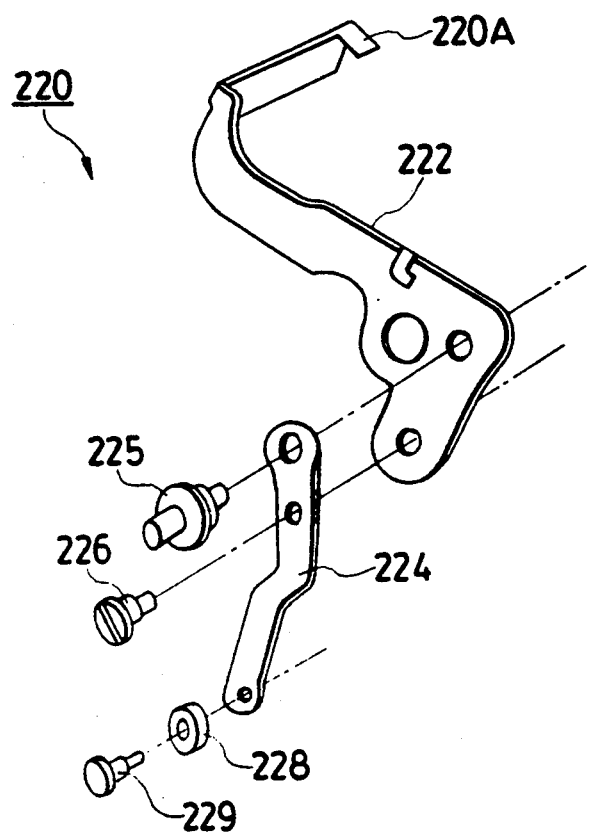
FIG. 18 is an exploded perspective view of an AF connecting lever part.

As shown in FIG. 18, the AF connecting lever part 220 has a finder AF connecting lever 222 and a driven lever 224. And, these two levers 222 and 224 are interconnected with each other by means of a connecting lever collar 225 and an eccentric pin 226. Also, the above-mentioned roller 228 is mounted to the lower end portion of the driven lever 224 by a roller shaft 229.

And, the driven lever 224 can be rotated only slightly about the connecting lever collar 225 with respect to the finder AF connecting lever 222, by rotating the eccentric pin 226. That is, the angle of mounting between the finder AF connecting lever 222 and driven lever 224 can be adjusted in a fine manner, and due to this fine adjustment, a parallax correction to be described later can be made with accuracy.

Now, the finder case section 200B stores therein a finder optical system, which includes an objective lens 232 movable vertically in the parallax correction, a moving lens 234 for use in zooming, a half lens 236 and an eyepiece 238, and distance measuring means including a projection lens 250, a light receiving lens 252 and other components.

In FIG. 19, there is shown an exploded perspective view of the finder case section 200B. In particular, in this figure, there is provided a finder case 230 and, in the two sides of the finder case 230, there are stored the abovementioned projection lens 252 and light receiving lens 252, respectively. In rear of the projection lens 250, there is disposed a projection frame base 254 on which an infrared ray diode (not shown) is placed, and in rear of the light receiving lens 252, there are disposed two silicone photo diodes (SPD) and the like (which are not shown). That is, the distance measuring means provided in the finder case section 200B employs an active type of trigonometrical measurement, in which an infrared ray of light is projected from the infrared ray diode onto an object and the infrared ray reflected by the object is then directed onto the two SPDs, so that a distance to the object can be measured by means of a ratio of the outputs of the two SPDs.

Also, in the central portion of the finder case 230, there are stored the objective lens 232, moving lens 234, half lens 236, reticle plate 237 and eyepiece 238 in this order.

The objective lens 232 is guided by its moving frame 232A in such a manner that it is freely movable in a direction (a vertical direction) perpendicular to the optical axis of the finder, and in the moving frame 232A there is disposed a moving frame spring 232B which is used to bias the objective lens 232 downwardly.

The moving lens 234 is guided movably in the finder optical axis direction by its moving frame 234A, moving frame stopper 234B and the like. On the lower surface of the moving frame 234A, there is provided a pin with which is engaged an elongated bore 240A formed in a frame lever 240. Also, the base end portion of the frame lever 240 is fixed to the rotary shaft portion of a lens lever 242 and further the lens lever 242 is biasing in the direction of an arrow A by means of a tension spring 244.

In FIG. 19, reference numeral 246 designates an AF base plate, 247 an upper cover, and 248 a lower cover.

Now, the leading end portion of the F intermediate lever 216 disposed on the side of finder carrier plate section 200A is engageable with a pin 242A provided on the lower surface of the lens lever 242. For this reason, when the F cam 204 is rotated in link with the zoom driving of the zoom lens, then the lens lever 242 is rotated by means of the F cam follower 206 and F intermediate lever 216. This rotational movement of the lens lever 242 causes the frame lever 240 to be rotated, so that the moving frame 234A with its pin in engagement with the elongated bore 240 in the leading end portion of the frame lever 240, that is, the moving lens 234 is moved in the finder optical axis direction. As a result of this, the angle of field of the finder can be made to coincide with that of the zoom lens. Here, if the zoom lens is driven in the telephoto side direction, then the moving lens 234 is moved rearwardly and, if the zoom lens is driven in the wide-photo side direction, then the moving lens 234 is moved forwardly.

On the other hand, the leading end portion 220A of the AF connecting lever part 220 disposed on the side of the finder carrier plate section 200A can be brought into contact with the lower end of the objective lens 232. Therefore, if the AF drive cam 178 of the focus drive part 170 is rotated in link with the automatic focusing, then the AF connecting lever 220 is rotated. And, responsive to the rotational movement of the AF connecting lever part 220, the leading end portion 220A is moved substantially in the vertical direction to thereby move the objective lens 232 vertically, so that the parallax correction can be achieved.

Also, when the zoom lens is in focus for an infinite distance, then the objective lens 232 is pushed up to the upper-most end against the biasing force of the moving frame spring 232B by the AF connecting lever part 220 and, as the zoom lens is focused in closer ranges, the objective lens 232 is lowered down accordingly.

As has been described hereinbefore, according to the zoom lens drive mechanism of the present invention, due to the fact that the zoom shaft is disposed in parallel with the optical axis of the zoom lens comprising the first and second groups of lenses, and also that the zoom cam ring for moving the first and second groups of lenses and the first lens group drive means having the focus cam means for moving the first group of lenses are both disposed on the zoom shaft, the zoom driving and focus driving of the zoom lens can be realized by a simple and compact mechanism. Also, the number of parts necessary for zoom adjustment can be reduced and thus the zoom adjustment can be achieved with accuracy by a simple adjustment mechanism. Further, as means for preventing the rotation of the first lens group drive means disposed on the zoom shaft, there is used the guide shaft of the zoom lens and, for this reason, a highly reliable prevention of rotation can be obtained and the number of parts required can be reduced to a minimum.

Moreover, due to the fact that the first lens group drive means and focus cam ring are respectively constructed so as to be able to advance in part into the hollow portion formed in the zoom cam ring, the length of the zoom lens drive mechanism in the zoom axis direction can be reduced.

In addition, by moving the objective lens of the finder in link with the automatic focus adjustment mechanism, the parallax can be corrected automatically by a relatively simple mechanism.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A parallax correction mechanism comprising:
   a finder guided so as to be freely movable in a direction where an objective lens moves towards and away from a taking lens;
   a focus adjustment mechanism for adjusting the focus of said taking lens so that an image of an object can be in focus on an image pickup surface; and,
   a connecting mechanism part for connecting said focus adjustment mechanism with said objective lens of said finder and for moving said objective lens in link with the operation of said focus adjustment mechanism.

2. A parallax correcting mechanism comprising:
   a viewfinder, comprising an objective lens movable along a first axis perpendicular to an optical axis of the viewfinder, and a movable lens movable along a second axis parallel to said optical axis;
   a focus adjustment mechanism for adjusting the focus of an image-taking lens so that an image of an object can be focused on an image pick-up surface;
   a zoom adjustment mechanism for adjusting the size of said image on said image pick-up surface;
   a first linkage for operatively connecting said focus adjustment mechanism with said objective lens and for moving said objective lens along said first axis in concert with said focus adjustment mechanism so as to correct for any parallax error between a viewed image viewed through said viewfinder and said image focused on said image pick-up surface; and
   a second linkage for operatively connecting said zoom adjustment mechanism with said movable lens and for moving said movable lens in concert with said zoom adjustment mechanism along said second axis so as to cause a field angle of said viewfinder to correspond to a field angle of said zoom adjustment mechanism.

* * * * *